Dec. 20, 1960     R. B. SMITH     2,965,560
PROCESS FOR THE REFORMING OF A NAPHTHA
IN SEVERAL STAGES
Filed Dec. 6, 1956
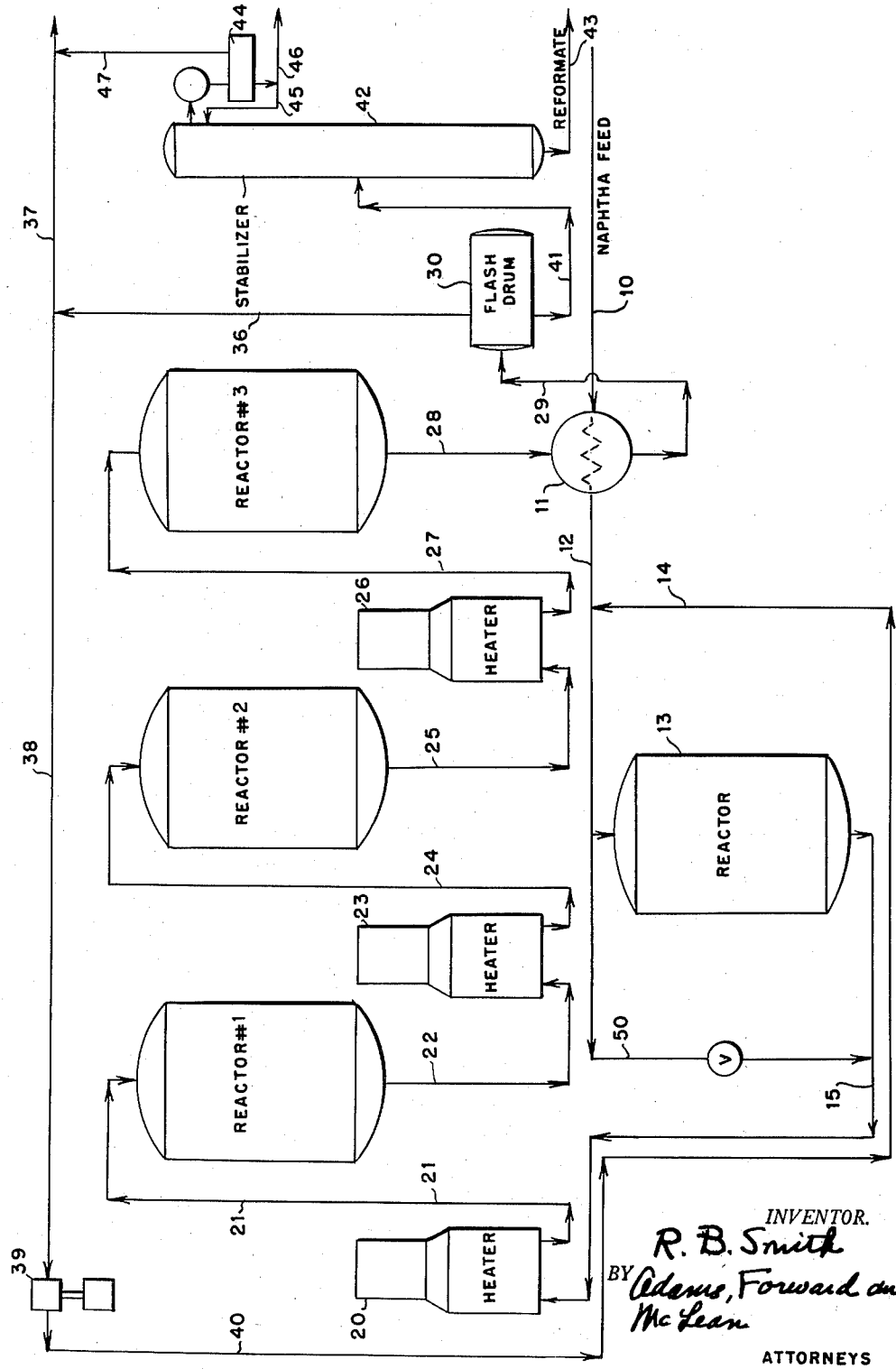
INVENTOR.
R. B. Smith
BY Adams, Forward and
McLean
ATTORNEYS

United States Patent Office 2,965,560
Patented Dec. 20, 1960

2,965,560

PROCESS FOR THE REFORMING OF A NAPHTHA IN SEVERAL STAGES

Reading Barlow Smith, Flossmoor, Ill., assignor to Sinclair Refining Company, New York, N.Y., a corporation of Maine Filed Dec. 6, 1956, Ser. No. 626,638

2 Claims. (Cl. 208—65)

This invention relates to the catalytic reforming of hydrocarbon fractions. More particularly this invention is concerned with the catalytic reforming in the presence of hydrogen of hydrocarbon fractions boiling in the gasoline and naphtha ranges in a multiple adiabatic catalyst bed conversion system employing platinum metal catalysts to improve the octane number of the feed or for aromatics production.

Due to the endothermic nature of the catalytic reforming operation it is conventional in the reforming of gasoline and naphtha hydrocarbons in the presence of platinum metal catalysts to employ multiple adiabatic catalyst bed conversion zones. In one method of operation the fresh feed is preheated to the desired inlet temperature for the first reactor, the effluent from the first reactor is reheated and passed to the second reactor, and the charge to subsequent reactors is provided by reheating the effluent of each previous reactor. Each of the several reactors may employ approximately identical inlet temperatures or alternatively the reactor inlet temperatures may vary.

The heat removed throughout the catalytic reforming reaction does not bear a simple relationship with increase in octane number. For example, in a system employing three equal size reactors each having an inlet temperature of about 920° F. to produce a product from the third reactor of 95 research octane number (neat) from a straight run naphtha of 40 research octane number (neat), the main portion of the temperature drop in the first reactor occurs in approximately the first 30% of the catalyst bed during an increase of 18 octane numbers and drops only slightly in the remainder of the bed during an increase of 12 octane numbers. Apparently, rapid dehydrogenation occurs in the first part of the bed whereas hydrocracking, an exothermic reaction, supplies enough heat to balance approximately the dehydrogenation reactions continuing at a reduced rate in the latter part of the first reactor bed. The second reactor shows the same effect except that the temperature drop in the first 30% of the bed is of lesser degree. The third reactor runs almost isothermally after dropping a few degrees below the inlet temperature. Due to these variations in bed temperature, the average catalyst bed temperatures are greatly different from one another, so that the catalyst in the third reactor, which operates at the highest average bed temperature, becomes first deactivated and is the limiting factor in the processing cycle since the aging rate of the platinum metal catalysts increases exponentially with temperature. Thus if the catalyst be a non-regenerative type and the overall activity level of the catalyst beds has declined to the point that the required octane cannot be made at the highest temperature permissible, the partially deactivated catalyst of the first two reactors is replaced along with the deactivated catalyst of the third reactor before maximum utility of the catalyst of the first and second reactors has been realized. Even if the catalyst be a regenerative type, the catalyst beds must be regenerated as soon as the bed of the last reactor falls below the lowest permissible activity level, thus losing potential processing time for the catalyst of the first and second reactors unless of course, considerable capital is expended to provide a swing reactor system. Due to the very high cost of the platinum metal catalysts, attempts to equalize the processing cycle for each of the reactors by varying the size of the catalyst beds contained therein or to extend the overall processing cycle by increasing the size of the catalyst bed in the last reactor have met with some success. Efficient use of the catalyst in all of the reactors, however, remains as a problem of substantial economic importance.

It has now been found that provision of a preliminary reactor operating at a relatively low reforming inlet temperature in series prior to the first high temperature reactor of a conventional multi-bed adiabatic reforming system in conjunction with particular temperature control of the charge to the first high temperature reactor provides significant advantages with respect to yield of reformate obtained from the reforming operation without sacrifice of octane number or decrease of the processing cycle. Thus according to the present invention, the hydrocarbon feed to a series connected, multiple reactor, platinum metal catalyst, adiabatic reforming system is initially contacted in a preliminary reactor with an additional separate adiabatic bed of platinum metal reforming catalyst under reforming conditions in the presence of hydrogen and at an inlet temperature of about 75° to 150° F. less than the temperature of the effluent from the last reactor in the series. Additionally, the temperature of the charge to the catalyst bed in the reactor next succeeding the preliminary reactor is below the temperature of the last reactor inlet in the series in an amount of at least about 75% of the temperature difference between the preliminary reactor charge inlet and effluent temperatures.

Advantageously the feed to the preliminary reactor is first heated by indirect heat exchange with the final reactor effluent. This preheat brings the feed to temperatures of about 780 to 880° F., preferably at least about 800° F. depending principally upon the outlet temperature of the final reactor effluent which in turn depends upon such factors as the octane of the reformate product and the portion of the operating cycle being effected. Thus when the catalyst is fresh the third reactor effluent temperature may be of the order of 900° F. whereas near the conclusion of the processing cycle this temperature may be about 975° F. which can be determinative of the temperature to which the feed is brought through indirect heat exchange with this effluent.

The increase in yield obtained by the process of the invention is apparently due to the fact that a portion of the dehydrogenation of naphthenes in the feed to aromatics, which would normally occur in the higher temperature portion of the first reactor, occurs in the preliminary reactor under considerably low temperature conditions. This lower temperature dehydrogenation results in less overall loss of naphthenes to paraffins and to fixed gases providing the inlet temperature to the first high temperature reactor is properly controlled. Thus in order to obtain near the maximum possible yield increase for any given preliminary reactor inlet temperature, it is necessary to provide a first high temperature reactor inlet temperature which is below the temperature of the last reactor inlet in an amount of at least about 75%, e.g. about 75 to 150%, of the temperature drop in the preliminary reactor so as to maintain approximately the same outlet temperature for the first high temperature reactor as would obtain in normal operation without the preliminary reactor. Preferably, this reduction in inlet temperature to the first high temperature reactor is about equal to the temperature drop in the preliminary reactor. It is again pointed out, however, that the increase in yield is not obtained at the sacrifice of octane number or decrease of the processing cycle.

Moreover, advantages are afforded by the process of this invention regardless of whether the subsequent high temperature catalyst beds are of unequal or equal sizes and regardless of whether the inlet temperatures of these beds are approximately identical or unequal as in a pattern of inlet temperatures increasing or decreasing from the first to the last reactor. The new process can be effected with a relatively low capital investment considering the advantages derived and is readily adaptable to existing units by adding a reactor in the feed line to the first reactor preheater.

To facilitate the understanding of this invention it will be described with reference to the drawing, which illustrates diagrammatically a reforming system employing the new method, and to the specific example. However, the drawing and the specific example which follow are presented for illustrative purposes and are not to be considered limiting.

Referring to the drawing the feed, for instance 40 research octane number (neat) straight run naphtha, enters line 10 and passes to heat exchanger 11 where the naphtha feed is heated to temperatures of about 780° F. to 880° F. by indirect heat exchange with the effluent from the final reforming reactor. The thus heated feed is then passed by line 12 to the preliminary adiabatic reactor 13 after being admixed with recycle hydrogen from line 14. Adiabatic reactor 13 contains a fixed bed of platinum metal-alumina catalyst of small particle size, for example approximating ⅛" in length and ¹⁄₁₆" in diameter. The effluent from reactor 13 is conveyed through line 15 to the first reactor preheater 20. The first reactor preheater effluent passes by line 21 to high temperature adiabatic reactor No. 1 at an inlet temperature of say for instance 910° F. at the beginning of the processing cycle. This reactor, as well as subsequent reactors, contains a bed composed of platinum metal catalyst which can be similar to that in the preliminary reactor 13. The effluent of reactor No. 1, which is at a temperature considerably reduced from its inlet temperature, is then carried by line 22 to interheater 23. In this interheater the first reactor effluent is brought to the inlet temperature desired for reactor No. 2.

The effluent from interheater 23 is conveyed to the high temperature adiabatic reactor No. 2 by way of line 24. The discharge from this reactor which is also at a temperature considerably less than its inlet temperature is passed through line 25 and reheated in interheater 26 to the inlet temperature for the high temperature adiabatic reactor No. 3. The effluent from interheater 26 goes through line 27 to the third high temperature reactor where the reforming operation is completed.

The product from reactor No. 3 passes by line 28 through heat exchanger 11 and line 29 to flash drum 30. Hydrogen and light gases, including hydrocarbon gases such as methane, ethane and propane and possibly hydrogen sulfide, are discharged from the flash drum 30 through line 36 with excess light hydrocarbon gases and hydrogen passing from the system through line 37. A desired portion of hydrogen and light hydrocarbon gases is withdrawn through line 38 for recycle and can be treated, for example, to remove hydrogen sulfide and then repressured in compressor 39 before being passed to preliminary reactor 13 by way of lines 40 and 14. Liquid unstabilized reformate from flash drum 30 goes through line 41 to stabilizer 42. Liquid stabilized reformate from tower 42 is withdrawn through line 43 while overhead from the tower is taken through a conventional cooler to drum 44. A liquid stream from drum 44 can be returned to the tower as reflux by line 45 and a light liquid stream can be withdrawn through line 46. Uncondensed gases from drum 44 can be passed by connection 47 to gas collection line 37.

The present invention is particularly advantageous in that it can be included as part of a new reforming system or is readily adaptable to existing reforming operations by insertion of the preliminary reactor in the feed line to the first reactor preheater. Also the provision of the preliminary reactor in the feed line to the first reactor preheater provides a means of guarding the catalyst bed of the high temperature reactors from physical and chemical impurities which can be highly detrimental to platinum metal catalysts. Should the catalyst of the preliminary reactor become excessively poisoned provision can be made for by-passing the feed around this reactor without necessitating shutdown of the entire reforming system. For instance, in the drawing valved line 50 is provided for this purpose. As an alternative two preliminary reactors can be piped in parallel and when one reactor is offstream the other could be onstream. Of course, in such a case if desired both of the reactors might be used simultaneously or both could be by-passed.

In a specific example illustrating the practice of this invention according to the system of the drawing, a typical straight run naphtha reforming feedstock of 180° to 350° F. ASTM boiling range, 37.5 research octane number (neat), 55.5° API gravity and analyzing by volume 49% paraffins, 36% naphthenes and 15% aromatics is initially passed to preliminary reactor 13 at an inlet temperature of about 800° F. The overall pressure in the preliminary reactor is about 350 p.s.i.g. and the feed rate is 30 WHSV (pounds of feed per hour per pound of catalyst). The hydrogen recycle gas to hydrocarbon mole ratio is about 7:1, and the preliminary reactor effluent temperature is 770° F.

The effluent from the preliminary reactor is heated in the first high temperature reactor preheater to afford an inlet temperature for the first reactor of about 910° F. The pressure in each of the high temperature reactors Nos. 1, 2 and 3 is about 350 p.s.i.g. The catalyst beds of these reactors, which are composed of ⅛" length x ¹⁄₁₆" diameter platinum-alumina (0.6 weight percent platinum) particles, are of unequal size and are larger than that of the preliminary reactor. The WHSV in reactors Nos. 1, 2 and 3 is, respectively, 18, 9 and 3. The overall WHSV based on the four reactors is 1.875. Heaters 23 and 26 raise the temperatures of the effluents of reactors Nos. 1 and 2, respectively, to provide inlet temperatures to reactors Nos. 2 and 3 of about 940° F. at the initial stage of the operation. The effluent temperature from the Nos. 1, 2 and 3 reactors are, respectively 822°, 874° and 922° F. Thus the feed to the preliminary reactor is at about 122° F. less than the effluent temperature from the No. 3 reactor. Since the temperature drop in the preliminary reactor is about 30° F., the inlet temperature to the No. 1 reactor, 910° F., is 30° F., or 100 percent of the temperature drop in the preliminary reactor below the No. 3 reactor inlet temperature (940° F.).

To maintain the octane level (95 RON, neat) of the product the inlet temperature of reactors 2 and 3 are raised as required during processing to about 975° F. while the inlet temperature of the feed to the first high temperature reactor, reactor No. 1, is 100% of the temperature drop in the preliminary reactor below the last reactor inlet temperature. Due to the heat exchange relationship between the effluent of No. 3 reactor and the feed in heat exchange 11, the inlet temperature of the feed to the preliminary reactor 13 gradually raises during processing to about 840° F.

The third reactor effluent is cooled to about 100° F. in heat exchanger 11 and is flashed in drum 30 at about 300 p.s.i.g. Necessary recycle hydrogen is withdrawn through line 38 as gases containing about 75% hydrogen. The flash drum liquid is debutanized in stabilizer 42 to recover fuel gas overhead and 95 research octane number (neat) reformate as bottoms.

The present invention can be employed in any reforming system using a platinum metal catalyst and a plurality of high temperature adiabatic fixed bed catalyst reactors. The feeds employed are the conventional petroleum reforming stocks boiling in the naphtha and gasoline ranges which can be substantially olefin-free. The reactors subsequent to the first high temperature reactor employ inlet temperatures generally in the range of about 900° F. to 975° F., preferably at least about 920° F. The hydrogen to hydrocarbon mole ratio employed will be in the range of about 2 to 20:1 with the overall space velocity usually being from about 1 to 20 WHSV. Advantageously, the preliminary reactor temperature drop will be at least about 20° F., and preferably is about 25 to 50° F. The system pressure can vary between about 100 to 1000 p.s.i.g. with about 300 to 500 pounds being preferred. The catalysts employed in this invention are the platinum metal reforming catalysts. Generally, these catalysts comprise about 0.1 to 2.0% by weight of platinum metal component on an alumina base. Such catalysts can include promoters, for instance fluoride or silica. The platinum metal of the catalyst is the essential active component and these metals include platinum, rhodium, palladium and iridium. The preferred metal is platinum.

It is claimed:

1. In the reforming of petroleum hydrocarbons of gasoline and naphtha boiling ranges in the presence of hydrogen and a platinum metal reforming catalyst and employing in series a plurality of adiabatic catalyst beds maintained under reforming conditions in separate reactors defining separate reaction zones, the improvement which comprises contacting the hydrocarbon feed with an adiabatic bed of platinum metal reforming catalyst in a preliminary reaction zone maintained under reforming conditions in the presence of added hydrogen, the charge being introduced into the preliminary reaction zone at an inlet temperature of about 75° to 150° F. less than the temperature of the effluent from the last catalyst bed in the series of reactors, passing the effluent of the preliminary reaction zone to a second adiabatic bed of platinum metal reforming catalyst in a reaction zone maintained under reforming conditions in the presence of hydrogen, the charge being introduced into the second reaction zone at an inlet temperature below the inlet temperature to the last reaction zone in the series in an amount of at least about 75% of the temperature difference between the preliminary reaction zone charge inlet and effluent temperatures, and passing the effluent of the second reaction zone to subsequent adiabatic beds of platinum metal reforming catalyst in reaction zones maintained under reforming conditions in the presence of hydrogen and at charge inlet temperatures of about 900 to 975° F.

2. The method of claim 1 in which the system pressure is about 300 to 500 p.s.i.g., the temperature of the charge to the preliminary reactor is about 780 to 880° F., the temperature difference between the preliminary reaction zone charge inlet and effluent temperatures is at least about 20° F. and the inlet temperatures for the subsequent reaction zones is about 920 to 975° F.

References Cited in the file of this patent
UNITED STATES PATENTS

| | | |
|---|---|---|
| 2,765,264 | Pasik | Oct. 2, 1956 |
| 2,773,013 | Wolf et al. | Dec. 4, 1956 |
| 2,853,436 | Roberts | Sept. 23, 1958 |